Mar. 3, 1925.  
K. L. TATE  
1,528,586  
INSTRUMENT FOR GAS ANALYSIS  
Filed Jan. 17, 1924
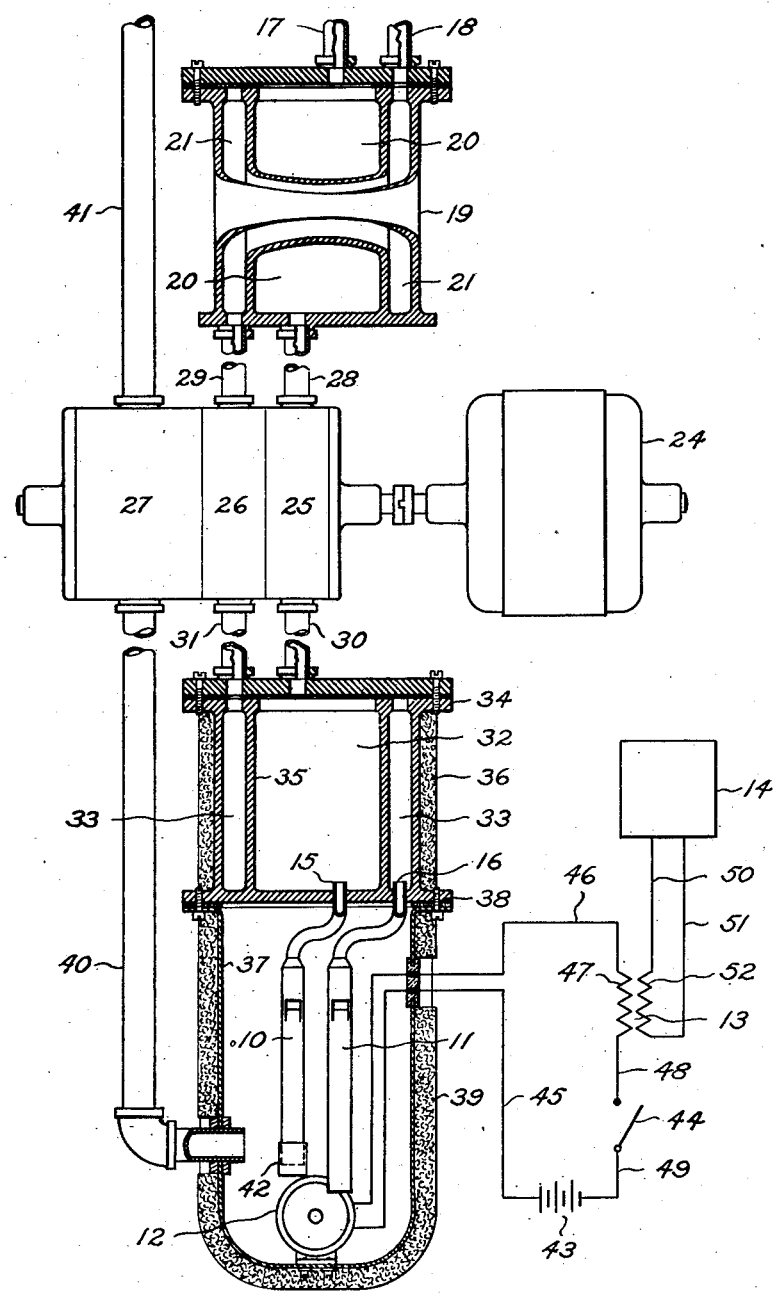
Inventor  
KENNETH L. TATE  
By  
G. H. Braddock  
Attorney Patented Mar. 3, 1925.

1,528,586

UNITED STATES PATENT OFFICE.

KENNETH L. TATE, OF STAMFORD, CONNECTICUT.

INSTRUMENT FOR GAS ANALYSIS.

Application filed January 17, 1924. Serial No. 686,749.

*To all whom it may concern:*

Be it known that KENNETH L. TATE, a citizen of the United States, and resident of Stamford, in the county of Fairfield and State of Connecticut, has invented certain new and useful Improvements in Instruments for Gas Analysis, of which the following is a specification.

This invention relates to an instrument for analyzing certain types of gases, and has more especial reference to an instrument for indicating, and preferably recording continuously, the percentage of carbon dioxide in the flue gas of a furnace.

As is common knowledge, the velocity of sound in a mixture of gases is a function of the specific heats and the densities of the gases taken together, so that when a mixture of gases contains a certain gas differing appreciably from other gases in said mixture in its physical properties which determine the velocity of sound, then the velocity of sound in said mixture varies with the amount of that certain gas present. As is also common knowledge, the pitch of an organ pipe, or the like, is proportional to the velocity of sound in a gas or gases contained in and surrounding said pipe.

Naturally it follows, that the pitch of an organ pipe, blown with a mixture of gases containing a certain gas differing from other gases in said mixture in its physical properties which determine the velocity of sound, varies with the percentage of that certain gas present.

The present invention relies upon the principles as just stated, and has for its broad object to provide an instrument having means for determining the amount of a certain gas or gases, differing in physical properties which determine the velocity of sound from other gases, in a mixture of gases, by indicating and preferably recording continuously the pitch of an organ pipe blown with said mixture of gases to be analyzed as compared with the pitch of an organ pipe blown with a gas or gases the velocity of sound in which is known, or equal to or approximately equal to the velocity of sound in like mixture of gases but minus said certain gas or gases to be determined, said means depending upon the phenomenon of the frequency of the beat or difference note of the organ pipes as a measure of the quantity of certain differing gas or gases (as stated) present in said mixture of gases.

A more specific object is to provide an instrument of the present character the determining means of which will comprise an apparatus for acoustically denoting the frequency of the beat or difference note of organ pipes one blown with a mixture of gases to be analyzed and the other simultaneously blown with a gas or gases the velocity of sound in which is known or equal to or approximately equal to the velocity of sound in like mixture of gases but minus said certain gas or gases to be determined, and electrical mechanism for indicating, and preferably recording continuously, that element of the effect produced by said acoustical apparatus which is indicative of the proportions of the gas or gases to be determined in said mixture of gases.

A still more specific object is to provide an instrument as set forth, wherein the acoustical apparatus will be constituted by a transmitter of ordinary or preferred construction adapted to denote the frequency of the beat or difference note of organ pipes blown as explained, and wherein the electrical indicating mechanism will include a circuit in which said transmitter is arranged, the circuit also including a transformer and an indicating, and preferably recording, frequency meter, said transformer and frequency meter likewise being of ordinary or preferred construction.

With the above objects in view, as well as others which will become obvious as the specification proceeds, the invention comprises the construction, arrangement and combination of parts as now to be fully described and as hereinafter to be specifically claimed, it being understood that the disclosure herein is merely illustrative of principles and meant in no way in a limiting sense, changes in details of construction and arrangement of parts of the instrument being permissible so long as within the spirit of the invention and the scope of the appended claims, and it being further understood that the instrument disclosed, while set up for use as an indicator and recorder of the percentages of carbon dioxide in flue gas, is capable of use in analyzing any mixture of gases wherein that component being measured has the property that the velocity of sound in said component differs from the velocity of sound in the remainder of the gases making up the mixture.

In the accompanying drawing, the figure is a diagrammatic view, partially in section, of an instrument in which the features of the invention are incorporated.

In said figure, 10 denotes an organ pipe adapted to be blown by a gas, as air, the velocity of sound in which is known, 11 a similar pipe adapted to be blown by a mixture of gases to be analyzed, as flue gas, 12 a transmitter, 13 a transformer, and 14 represents a frequency meter, each of any construction suitable to its purpose.

Any suitable arrangement can be utilized to transmit the known and unknown gases (air and flue gas) to the inlets, denoted 15 and 16, respectively, of the organ pipes 10 and 11, to blow said pipes. Of this arrangement, 17 represents an ordinary pipe adapted to contain a known gas, as, for example, air, to be delivered to the organ pipe 10, and 18 an ordinary pipe leading from a flue (not shown) and adapted to contain flue gas to be delivered to the organ pipe 11. Numeral 19 denotes a filter having chambers 20 and 21 with which the pipes 17 and 18, respectively, communicate. The filter is for the purpose of removing solid matter and moisture from the known and unknown gases as they pass along to the organ pipes, and to this end may contain some porous material (not shown), such as asbestos fiber. Evidently, the filter need only be used when necessary.

Numeral 24 denotes a motor having three blower units 25, 26 and 27 which may be of any desired and suitable construction, the units 25 and 26 preferably being duplicates arranged parallel with and adjacent to each other. Said units 25 and 26 are adapted to draw the gases from the chambers 20 and 21, 28 and 29 representing ordinary pipes connecting the chambers 20 and 21 with the units 25 and 26, respectively, and 30 and 31 representing ordinary pipes extending from said units and entering chambers 32 and 33, respectivel, of an equalizing casing denoted generally at 34. The main purpose of providing the chambers of the equalizing casing, one surrounding the other as shown, is to bring about a constant temperature difference in the gases adapted to pass into the inlets 15 and 16 of the organ pipes 10 and 11. These chambers perform the further duty of blotting out pulsations in pressure coming from the units 25 and 26 of the blower. To better accomplish the constant temperature purpose, a highly conducting wall 35 of large surface separates the chambers 32 and 33. Metal turnings can also be placed in these chambers to act as baffles to sudden changes in temperature by virtue of their heat capacity. Thick felt 36 surrounding the equalizing casing 34 is adapted to prevent sudden flows of heat into or out of the chambers and to assist in muffling the sound of the organ pipes.

The inlet 15 and 16 of the organ pipes 10 and 11 are arranged in a wall of the equalizing casing in such manner as to afford communication between the chambers 32 and 33 and the organ pipes, the inlet 15 entering the chamber 32 and the inlet 16 entering the chamber 33.

It is to be understood that all of the parts of the instrument so far described and the joints between said parts, including the pipes 17 and 18, the filter 19, the pipes 28 and 29, the blowers 25 and 26, the pipes 30 and 31, and the equalizing casing 34, are gas tight in order that gases drawn from the pipes 17 and 18 and forced into the chambers 32 and 33 of the equalizing casing will enter the inlets 15 and 16 of the organ pipes without waste of gas, said inlets being snugly fitted in the lower wall of said casing.

Numeral 37 represents a housing situated about the organ pipes 10 and 11 and secured, in any suitable manner to be gas tight, to the casing 34 as denoted at 38, thick felt 39 surrounding the housing to prevent sudden flows of heat into and out of the housing and to assist in muffling the sound of the organ pipes.

Numeral 40 represents an ordinary pipe leading from the lower portion of the housing 37 adjacent the open ends of the organ pipes 10 and 11 and entering the unit 27 of the blower, and 41 denotes an ordinary pipe leading from said unit 27 and adapted to enter the stack. Obviously, the purpose of the pipe 40, the unit 27 and the pipe 41 is to withdraw the gases from the housing 37 as fast as they accumulate, and the unit 27 is constructed to have a capacity with respect to the duplicate units 25 and 26 to accomplish this purpose.

When the instrument is functioning, a stream of the mixture of gases to be analyzed (flue gas) is blown by the unit 26 into the chamber 33 and a stream of known gas or gases (air) is blown by the unit 25 into the chamber 32, the arrangement being such that the pressure in one of said chambers is identical with the pressure in the other chamber. From these chambers 32 and 33 the air and flue gas escape through the organ pipes 10 and 11, respectively, to blow said organ pipes and to enter the housing 37, whence they are carried by way of the pipe 40 and blower unit 27 to pipe 41 leading to the stack, the filter 19 and the chambers 32 and 33 of the equalizing casing having performed their intended functions as already described as the gases have passed along.

Given an even and steady stream of air (or other gas the velocity of sound in which is known) entering organ pipe 10, and an equal and steady stream of flue gas (or other mixture of gases the velocity of sound in which is unknown) entering organ pipe 11, a description will now be given of one manner in which the percentage of carbon dioxide in the flue gas can be indicated and recorded. Organ pipe 11 blown by the flue gas has a pitch, say, of 1020 vibrations per second when the flue gas contains no carbon dioxide (as would be the case when there is no fire), and organ pipe 10 blown by air sounds a note, say, of nearly constant pitch, 1000 vibrations per second for example. The difference in pitch of 20 vibrations per second between the notes of the two organ pipes can easily be obtained by making organ pipe 10 shorter than organ pipe 11 as by use of the adjustable tuning sleeve 42 on the open end of organ pipe 10. Assuming this is a zero adjustment, once it is effected the organ pipes can be permanently enclosed in the housing 37. Now, let the flue gas contain carbon dioxide in proportions found in power plant practice. The pitch of organ pipe 11 becomes lower in a definite relation to the percentage of carbon dioxide in the flue gas blown into the body of this pipe, for the reason that the velocity of sound in pure carbon dioxide is considerably slower than it is in the other constituents of flue gas taken together. The lowering of the pitch of this pipe is measured by observing the frequency of the difference note generated by the simultaneous sounding of the two pipes. From this it will be seen that the frequency of the difference note is a measure of the carbon dioxide content of the flue gas. The manner in which the frequency of the difference note is determined is described hereinafter.

As disclosed, the transmitter 12 may be arranged adjacent to or contiguous with the organ pipes 10 and 11 in any suitable manner, preferably beneath the open ends of the organ pipes, to receive the notes of said organ pipes along with the beat or difference note of the pipes, and said transmitter, transformer 13 and frequency meter 14 are all in a single electrical circuit including a battery 43 and a switch 44, a lead wire 45 connecting the battery with the transmitter, a lead wire 46 connecting said transmitter to the primary 47 of the transformer, a lead wire 48 extending from said transformer to said switch, a lead wire 49 connecting said switch with said battery, and lead wires 50 and 51 connecting the secondary 52 of the transformer with the frequency meter. By virtue of the natural and well known properties of the transmitter and electrical circuit described, alternating currents capable of being indicated by a frequency meter are set up in the secondary of the transformer when the transmitter is functioning, the present frequency meter being of such proportions as to indicate, and preferably record continuously, only the frequency of the beat or difference note of the two organ pipes. Obviously, this frequency as measured corresponds to a definite percentage of carbon dioxide in the flue gas, granting that the meter has been previously calibrated in terms of percentage of carbon dioxide as found by chemical analysis of the flue gas passing into the instrument.

The character of the gas utilized to blow an organ pipe such as the pipe 10 had best be determined in the general manner as follows: Organ pipes such as the pipes 10 and 11 illustrated and described must be blown by different gases, pipe 11 by the mixture of gases containing the component the amount of which is to be measured by the instrument, and pipe 10 preferably by a like mixture of gases minus that component under observation. When components in a mixture of gases being analyzed have values for the velocity of sound quite different from each other and from a component under observation and then those first mentioned components vary in amount along with the component under observation, this rule of selecting a gas or gases to blow an organ pipe such as the pipe 10 must be followed. However, should components not under observation in the mixture of gases have nearly the same values for the velocity of sound in them and yet these components vary in amount, or should components not under observation have widely different values for the velocity of sound and still these components occur in relatively small quantities, then an organ pipe such as the pipe 10 can be blown by any gas or gases of constant composition. The latter is the case of carbon dioxide in flue gas and it is for this reason that air can be used to operate one of the organ pipes.

The frequency of the beat note should always increase with increasing amounts of the component sought in the analysis whether such component has a higher or a lower value for the velocity of sound than that of the other components of a mixture of gases. That is, when analyzing a mixture of gases where the component to be determined has a higher value for the velocity of sound in the pure component than in the remainder of components in said mixture of gases taken together, then an organ pipe such as the pipe 11 should be shorter than an organ pipe such as the pipe 10 by, say, 20 vibrations per second when the organ pipe such as the pipe 11 contains none of said component under observation. This arrangement of organ pipe lengths is desirable, for when the percentage of a component to be determined and having a higher value for the velocity of sound than the remainder of the components in a mixture of gases increases the pitch of an organ pipe such as the pipe 11 will rise to increase the frequency of the beat or difference note.

Having thus fully described the invention, what I claim as new and desire to secure by Letters Patent is:

1. In an instrument for determining the amount of a certain gas or gases in a mixture of gases, said gas or gases to be determined differing from the remainder of said mixture in physical properties which determine the velocity of sound in all gases, an acoustical apparatus for denoting the difference note in two pipes of different pitches one blown by said mixture of gases having said certain gas or gases to be determined and one blown by a gas the velocity of sound in which is known, and mechanism for indicating the frequency of the difference note denoted by said acoustical apparatus.

2. In an instrument for determining the amount of a certain gas or gases in a mixture of gases, said gas or gases to be determined differing from the remainder of said mixture in physical properties which determine the velocity of sound in all gases, an acoustical apparatus for denoting the difference note in two pipes of different pitches one blown by said mixture of gases having said certain gas or gases to be determined and one blown by a gas the velocity of sound in which is known, and an electrical circuit in which said acoustical apparatus is arranged for indicating the frequency of the difference note denoted by said acoustical apparatus.

3. In an instrument for determining the amount of a certain gas or gases in a mixture of gases, said gas or gases to be determined differing from the remainder of said mixture in physical properties which determine the velocity of sound in all gases, an acoustical apparatus for denoting the difference note in two pipes of different pitches one blown by said mixture of gases having said certain gas or gases to be determined and one blown by a gas the velocity of sound in which is known, and an electrical circuit in which said acoustical apparatus is arranged, said electrical circuit also including a transformer in which alternating currents are set up when said acoustical apparatus is functioning, and a frequency meter adapted to indicate the frequency of alternating currents set up in said transformer denoting said difference note.

4. In an instrument for determining the amount of a certain gas or gases in a mixture of gases, said gas or gases to be determined differing from the remainder of said mixture in physical properties which determine the velocity of sound in all gases, an acoustical apparatus for denoting the notes of two pipes having different pitches and the difference note in said pipes one blown by said mixture of gases having said certain gas or gases to be determined and one blown by a gas the velocity of sound in which is known, and an electrical circuit in which said acoustical apparatus is arranged, said electrical circuit also including a transformer in which alternating currents are set up when said acoustical apparatus is functioning, and a frequency meter adapted to indicate the frequency of those of said alternating currents denoting the difference note of said pipes set up in said transformer.

5. In an instrument for determining the amount of a certain gas or gases in a mixture of gases, said gas or gases to be determined differing from the remainder of said mixture in physical properties which determine the velocity of sound in all gases, an acoustical apparatus for denoting the notes of two pipes having different pitches and the difference note in said pipes one blown by said mixture of gases having said certain gas or gases to be determined and one blown by a like mixture of gases minus said certain gas or gases to be determined, and an electrical circuit in which said acoustical apparatus is arranged for indicating the frequency of the difference note denoted by said acoustical apparatus.

6. In an instrument for determining the amount of a certain gas or gases in a mixture of gases, said gas or gases to be determined differing from the remainder of said mixture in physical properties which determine the velocity of sound in all gases, an acoustical apparatus for denoting the notes of two pipes having different pitches and the difference note in said pipes one blown by said mixture of gases having said certain gas or gases to be determined and one blown by a like mixture of gases minus said certain gas or gases to be determined, and an electrical circuit in which said acoustical apparatus is arranged, said electrical circuit also including a transformer in which alternating currents are set up when said acoustical apparatus is functioning, and a frequency meter adapted to indicate the frequency of those of said alternating currents denoting the difference note of said pipes set up in said transformer.

7. In an instrument of the character described, two pipes adapted to be blown by separate gases and to have different pitches, one of said gases having a component the physical properties which determine the velocity of sound in which are different from other components of said gas, a transmitter for denoting the notes and difference note of said pipes while being blown, an electrical circuit in which said transmitter is arranged, said circuit including a transformer adapted to have set up therein alternating currents indicative of said notes and difference note while said transmitter is functioning, and a frequency meter for indicating the frequency of those alternating currents in said transformer indicative of said difference note, said frequency meter being calibrated with respect to said pipes and transmitter in terms of quantities of said component having said different properties which determine the velocity of sound, whereby said frequency meter is adapted to indicate said difference note and hence the quantity of said component in one of said gases blowing one of said pipes and having said different physical properties.

Signed at Bridgeport, in the county of Fairfield and State of Connecticut, this 16th day of January, A. D., 1924.

KENNETH L. TATE.